Patented Nov. 9, 1937

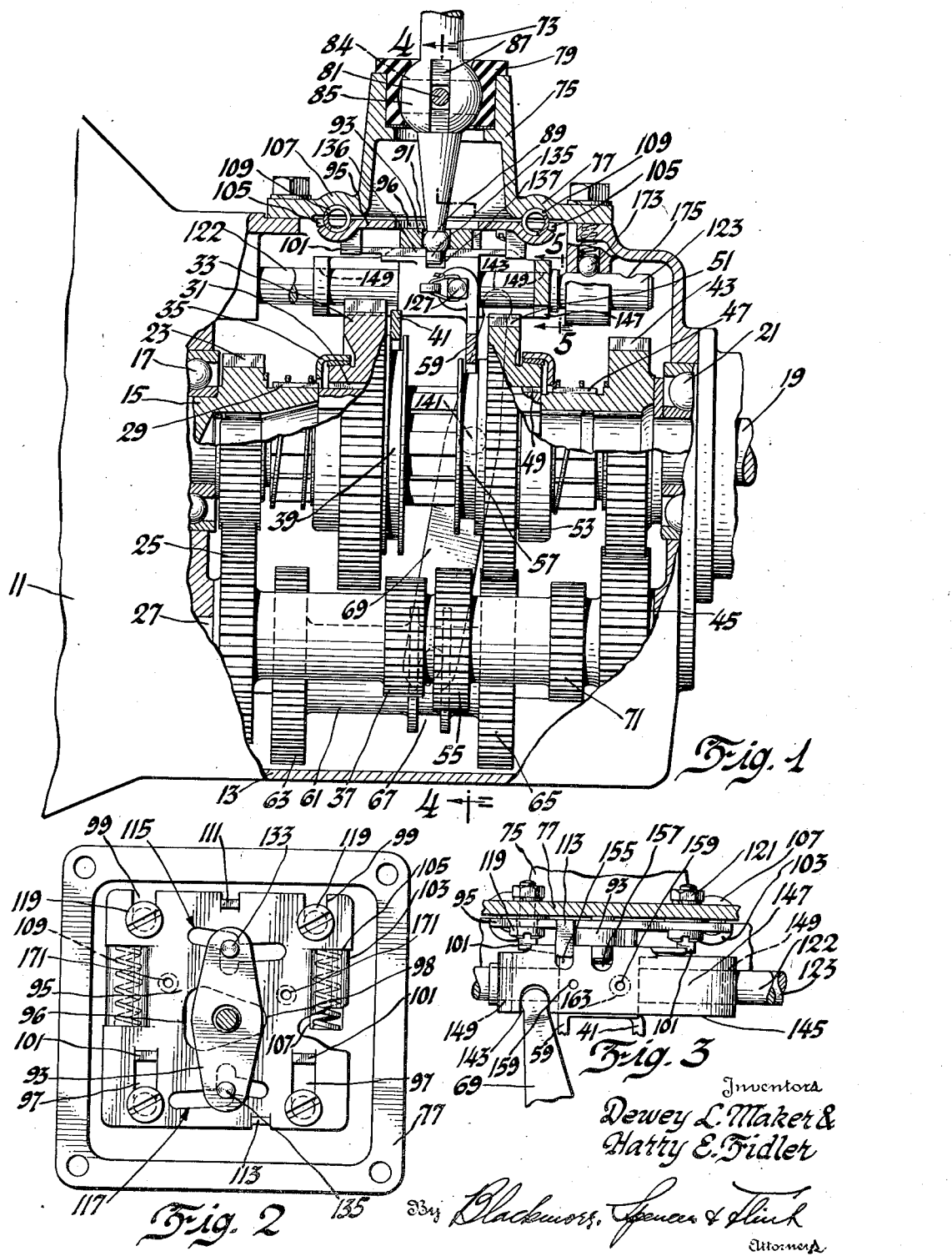

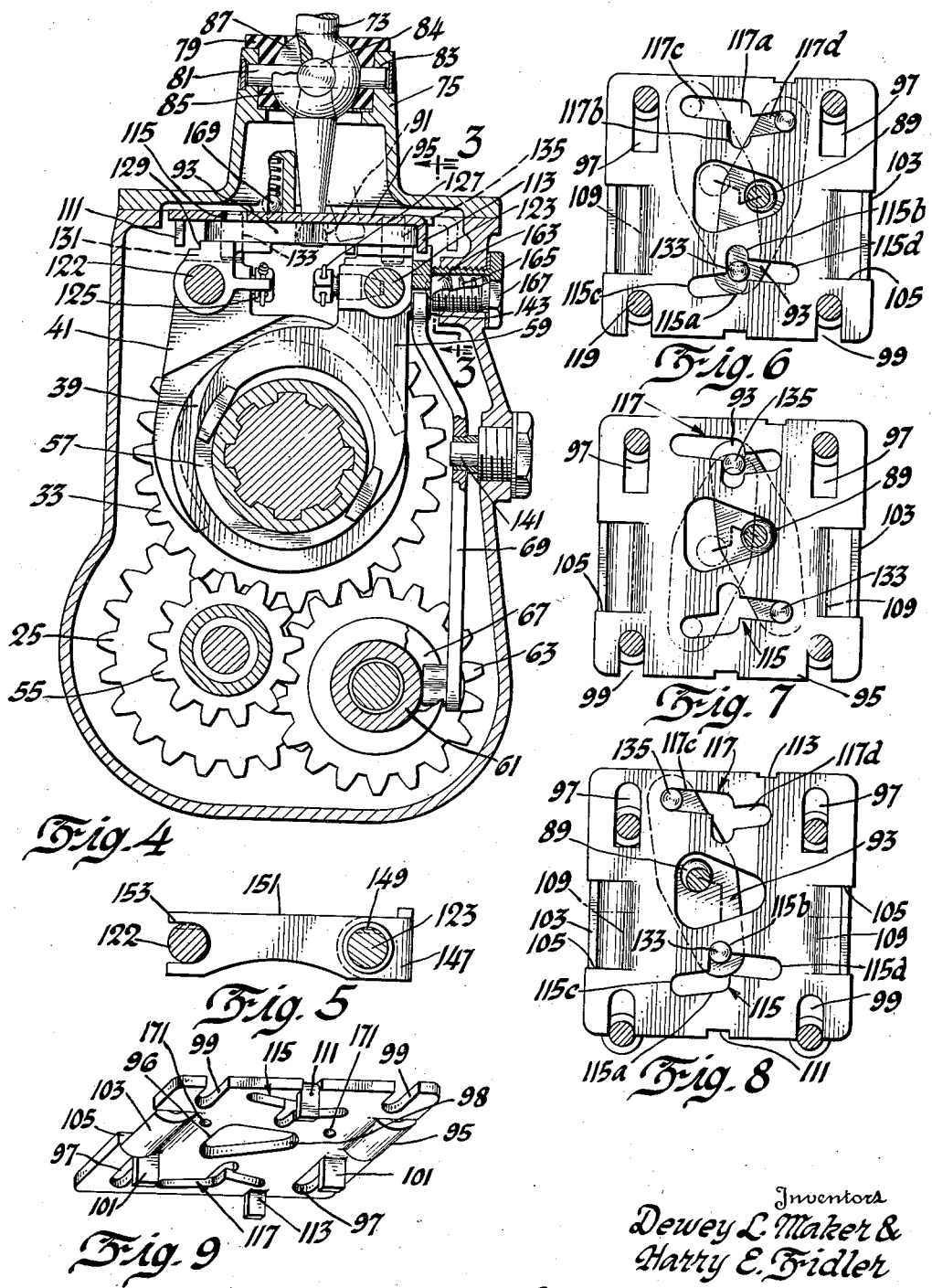

2,098,708

UNITED STATES PATENT OFFICE 2,098,708

GEAR SHIFT MECHANISM

Dewey L. Maker and Harry E. Fidler, Detroit, Mich., assignors to General Motors Corporation, Detroit, Mich., a corporation of Delaware Application January 27, 1936, Serial No. 60,919

5 Claims. (Cl. 74—473)

This invention relates to change speed mechanism such as is used on vehicles. It has been designed as an improvement in the control mechanism by which the several speed ratios between the input and output shafts are obtained.

An object of the invention is to provide a simple, compact, inexpensive mechanism by which the driving ratio may be readily changed.

Other and more specific objects will appear from the following description.

In the accompanying drawings:

Fig. 1 is a view in side elevation, the transmission housing being broken away.

Fig. 2 is an inverted plan view of the housing cover with parts associated therewith.

Fig. 3 is a view as seen from line 3—3 of Fig. 4.

Fig. 4 is a transverse section substantially on line 4—4 of Fig. 1.

Fig. 5 is a view as seen from line 5—5 of Fig. 1.

Figs. 6, 7, and 8 are plan views of relative movable parts to illustrate several operative positions.

Fig. 9 is a detail in perspective.

Referring by numerals to the drawings, there is shown in Fig. 1 the clutch housing 11 of a motor vehicle to the rear of which and integral therewith is a change speed transmission housing 13.

The transmission mechanism includes an input shaft 15 journaled in the housing 13 at 17 and an output shaft 19 journaled at 21. The input shaft has a gear 23 in constant engagement with a gear 25 on a countershaft 27. Adjacent gear 23 the input shaft has clutch teeth 29 engageable with teeth 31 on a gear 33 slidable but non-rotatable on the inner end of the output shaft 19. A synchronizing clutch is marked by numeral 35. When gear 33 is moved to the left, its teeth 31 lock with teeth 29, subsequently to synchronism being effected by friction clutch 35, whereupon the input and output shafts are locked for rotating together—the fourth or high speed drive for this transmission. On the countershaft is a gear 37 adapted to engage gear 33 when the latter is moved to the right from its position shown. The engagement of these teeth provides the first or low speed through the instrumentality of gear trains 23—25 and 37—33. Gear 33 has a collar 39 to be engaged by a fork 41 to make the aforesaid shifts.

Freely rotatable on the output shaft adjacent bearing 21 is a gear 43. It is in constant mesh with a countershaft gear 45. Gear 43 has a hub with clutch teeth 47 adapted to engage teeth 49 on a gear 51 slidably but not rotatably mounted on the output shaft. Gear 51 may be moved to the right to engage teeth 49 and 47 subsequently to the action of a synchronizing clutch 53 to thereby lock gear 43 to the output shaft. This provides a third speed or high intermediate drive through the instrumentality of gear trains 23—25 and 45—43. A second speed or low intermediate is accomplished by sliding gear 51 to the left and into mesh with countershaft gear 55, the drive then being through gear trains 23—25 and 55—51. Gear 51 has a collar 57 engaged by a fork 59 for making these shifts.

Reverse driving makes use of a straddle idler element 61 having two gears 63 and 65. A collar 67 is engaged by the lug on the end of a lever 69. Reverse driving is accomplished by rotating the lever 69 to move gear 63 into mesh with gear 33 and a gear 65 into mesh with another gear 71 on the countershaft. This drive employs gear trains 23—25, 71—65, and 63—33.

The mechanism for shifting the gears employs a shift lever 73 pivoted in a dome 75 of cover 77. In the top of the dome is inserted a rubber cylindrical block or seal 79. A pin 81 extends through the rubber block and is rotatably supported in apertures 83 extending through the dome, the aperture lying in the line transversely of the longitudinal axis of the housing. The pin extends through a cylindrical member 84 rotatable in a spherical part 85 of the lever, the latter located in a similarly shaped opening in the rubber block. The lateral sides of the part 85 have slots 87 to accommodate the pin 81 as member 84 rotates in 85. By this construction the lever is supported for universal movements and the rubber serves to prevent leakage and also prevents noise. An enlargement 89 on the lower end of the shift lever enters a hole 91 in a lever 93. To reach the lever 93 the lower end of the shift lever extends through a triangular shaped opening in a plate 95 shown in perspective in Fig. 9, one side 96 of the opening being positioned toward the front of the plate, and an apex 98 being toward the rear. The plate 95 has two closed slots 97 adjacent one side and extending transversely. Adjacent the other sides are two open slots 99. Tongues 101 in axial alignment are turned down from the ends of slots 97. Midway between the sides of the plate and at both front and rear ends the material of the plate is depressed to form channels as at 103 terminating in walls 105. These channels cooperate with like channels 107 formed in the cover plate 77. The channels house coil springs 109 normally engaging the shoulders 105 and similar shoulders in the channel of the cover plate. The plate also has other tongues 111 and 113 turned down from its side edges, which tongues are axially out of alignment. The plate 95 is further formed with slots 115 and 117 shaped as shown, the purpose of the shape to be further explained. The plate 95 is mounted for transverse sliding and to be held from any other movement. This action is provided by guide pins 119. The pins, four in number, extend through the slots 97 and 99, their heads being below the plate 95. The springs 109 resist transverse movement of the plate. The pins extend through the cover plate and are held by nuts 121. The lever 93 lies adjacent the lower face of plate 95. At its ends are pins movable in slots 115 and 117 and extending through and below the lever for a purpose to be described.

The housing has two shift rods or rails 122 and 123. These rails are axially slidable in the housing. Rail 122 carries fork 41, the fork being secured by a set screw 125. Similarly a set screw 127 secures fork 59 to rail 123. Fork 41—the fork for shifting gear 33 to effect direct or fourth speed and low or first speed—is positioned by its rail 122 beneath plate 95. When fork 41 is in its mid position the tongue 111 registers with a transverse slot 131 in the top of the fork. This slot is also adapted to be engaged by the pin 133 projecting from the end of lever 93 so that fore and aft movement of this pin may reciprocate the fork. Fork 59 has a head elongated as at 136 so as to engage both lugs 101 when the relative positions of this fork and the plate 95 permit it. In the other position of relative transverse adjustment the ends of its head are free to slide axially between these lugs and the lug 113. This fork too has its head formed with a transverse slot 137 to be engaged by a pin 135 projecting from the lever 93. It will be seen that pin 133 in addition to entering slot 131 of the high speed fork also extends above the lever 93 and enters slot 115 of plate 95, and that pin 135 similarly operates in slot 117 as well as in the slot 137 of fork 59.

To aid in understanding the operation it may be well to describe more particularly the shape of slots 115 and 117. Slot 115 has a central transverse region having an outer part 115a and an inner part 115b. It has a forward divergent part 115c and a rearward divergent part 115d. Slot 117 has a central transverse region with an outer part 117a and an inner part 117b. It has a forward divergent part 117c and a rearward divergent part 117d.

Fig. 2 shows the parts in their neutral position. It should be explained that the head of fork 41 is positioned sufficiently inward from the edge of plate 95 so that lug 111 is not in the slot 131. In this way the fork is free to move fore and aft as far as this lug is concerned. Similarly the head of fork 59 is normally disposed outwardly from between lugs 101. The lever pins 133 and 135 extend below the lever 93 into the fork slots and also, above the lever, they enter the mid portion of the slots 115 and 117 as shown. When lever 93 is so positioned the lever 73 is incapable of moving it forwardly or rearwardly because the pins 133 and 135 engage the four corner obstructions as shown. If it be desired to shift into low or first speed the shift lever 73 is rocked transversely so that its end 91 moves lever 93 transversely. The movement may be regarded as illustrated by a bodily downward movement of lever 93 in Fig. 2 or an upward movement in Figs. 6, 7, and 8. This moves the pin 135 into slot 117a and the pin 133 is at the front end of slot 115d. The lever 73 is then rocked longitudinally so that its lower end moves rearwardly. Since the pin 135 engages the rear wall of slot 117a the movement causes pin 133 to move diagonally to the rear end of slot 115d, carrying gear 33 to its low speed position in mesh with gear 37. In this operation fork 59 cannot be moved from its neutral position because pin 135, located in the slot of fork 59, slides along the wall of slot 117a and is unable to move rearwardly. The position of parts for low speed is shown by dotted lines in Fig. 7.

For second speed, lever 73 is returned to the position from which it was moved in shifting to low, the pin 133 moving in the angular slot 115d and the pin 135 moving transversely to the outer end of slot 117a. A continued forward movement of the lower end of lever 73 in the same direction now moves lever 93 forwardly, its pin 135 moving to the end of slot 117c while pin 133 slides along the forward wall of slot 115b. Fig. 6 shows the position by a dash and dotted line. It may be explained that the movement of the knob end of lever 73 from first speed to second speed is almost rectilinear.

For third speed, lever 93 again returns to normal as in Fig. 2. A slight transverse movement of lever 93 moves pin 133 into slot 115a after which pin 135 is moved rearwardly in slot 117d. This is shown by dotted lines in Fig. 6. A return to the position from which third speed was effected and a continued forward movement of lever 93 brings it to the dot and dash position of Fig. 7, which corresponds to the fourth or highest speed position of the transmission, the pin 133 moving in slot 115c.

In the case of each shift one pin, 133 or 135, which is to move a fork, has a movement which is mainly longitudinal but, owing to the angular direction of the slots, has a slight transverse component. The other pin moves to accommodate this movement by a sliding movement in contact with a wall of the transverse slot and, since this pin is restrained from anything but transverse movement, the fork associated with it cannot be shifted from its neutral position. The shift from first to second requires a substantially rectilinear movement of the knob of the shift lever. A similar rectilinear movement provides for shifts between third and fourth speeds. Between second speed and third speed there is a transverse movement of the lever 95 and of the knob of lever 73, of course.

For reverse shifting there is the lever 69 pivoted at 141 and engaging by its lower end the collar 67 of the reverse idler. The upper end of lever 69 is received in a notch 143 in the lower edge of side 145 of a U-shaped bar 147. This bar has its end arms provided with aligned apertures as at 149 for slidingly supporting the U-shaped bar on rail 123. One of the end arms is extended as at 151 and has a slot 153 to straddle rail 122. The upper edge of side 145 has a notch 155 normally engaged by tongue 113 of plate 95, whereby the U-shaped bar may not reciprocate on the rails and whereby no shift into reverse may occur. However, after the lever 93 is moved bodily in a transverse direction, downwardly in Fig. 2, to its limit of movement relative to plate 95, it may be moved further together with the plate 95. In such movement, lug 111 enters the slot of fork 41 and lugs 101 engage the ends of fork 59 to lock from movement the two forks which control forward speeds. Tongue 113 moves from notch 155 and lever pin 135 moves from fork slot 137 and enters a notch 157 in bar 147 adjacent notch 155. Since pin 133 is in the innermost part 115b of slot 115, longitudinal movement of lever 73 will swing lever 93 and its pin 135 will reciprocate the U-shaped bar 147. This rocks lever 69 and slides the idler 61 and the transmission is then in reverse.

The bar 147 is provided with openings 159 to receive a detent ball 163 projected by a spring 165 located in a threaded plug 167 in the side of the housing. The openings 159 correspond with the neutral and active positions of bar 147. Spring pressed balls 169 are mounted in the cover to engage suitable openings 171 in the plate 95 corresponding to forward speed and reverse speed of the transmission. Spring pressed balls 173 are shown as used to engage notches 175 in the forward speed rails, these notches corresponding to neutral and active positions of the shifting rail forks as is usual.

The operation is as follows: The arrangement has been designed for a right-hand drive vehicle, the driver being seated at the right side of the mechanism. To shift from neutral to first speed he shifts the knob end of lever 73 transversely to his left and then moves it forwardly. For second speed he pulls the knob end diagonally back, pin 133 moving forward from the first speed position shown by dotted lines in Fig. 7 to the transverse slot where it slides along slot 115b while pin 135 is sliding in slot 117c. After the parts are returned to neutral, the operator shifts to third speed by moving the knob toward his right, pin 133 being moved to slot 115a. Then, as the knob of lever 73 is moved forwardly, pin 135 moves into slot 117d and pin 133 slides along the rear wall of the slot 115a. High speed is obtained by a rearward diagonal movement of the knob end of lever 73, the lever 95 assuming the position shown by the dot and dash position of Fig. 7. For reverse the knob end of the lever 73 is shifted beyond its neutral position transversely to the left by the operator. The tongues 111 and 101, 101 lock the forward speed forks and tongue 113 is released from the reverse shift mechanism. A rearward movement of the knob end of the lever operates through the bar and lever 69 to shift the collar 61 to reverse driving position, pin 135 moving in slot 117c.

We claim:

1. In a change speed transmission having gearing elements, a shift lever, a floating lever engaged thereby, shift forks having parts to operably engage the ends of the floating lever, said shift lever and floating lever having a neutral position wherein said forks hold said gearing elements in non-driving positions, mechanism having parts cooperating with said floating lever to impart a transverse movement thereto and also a rocking movement about one end thereof, in response to a movement of the floating lever by a fore and aft movement of the shift lever between its neutral and active positions.

2. The invention defined by claim 1, said mechanism being further constructed to impart a substantially continuous transverse movement to the floating lever and to reverse its direction of rocking as the floating lever is moved through its neutral position from one extreme position to another whereby a substantially rectilinear movement of the shift lever from one extreme position to another extreme position shifts a first fork from an active to a neutral position and then shifts a second fork from a neutral to an active position.

3. In change speed mechanism, a shift lever, a floating lever engaged thereby adapted to be moved from a first extreme position to a first neutral position and then to a second extreme position, shift forks having parts operably engaging the ends of the floating lever and mechanism constructed to impart a transverse movement and simultaneously to impart successive and opposite pivotal movements to the floating lever whereby a substantial rectilinear fore and aft movement of the shift lever between its extreme positions shifts a first fork from an active to a neutral position and then a second fork from a neutral to an active position, said mechanism also constructed to permit said floating lever to assume a second neutral position in response to a transverse movement of the shift lever, said floating lever then being adapted to be rocked and transversely moved by said mechanism in response to fore and aft movements of the shift lever but in opposite directions whereby reversed directions of movement are imparted to said forks and other driving ratios are obtained.

4. In change speed mechanism, a shift lever, a floating lever engaged thereby to be moved from a first extreme position to a first neutral position and to a second extreme position, shift ratio forks having parts operably engaging the ends of said floating lever and mechanism operable to rock said floating lever about fulcra first at one end and then at the other as it is being bodily moved between its extreme positions, said mechanism comprising a plate having opposed cam slots, each slot having a transverse part and forward and rearward extensions, the extensions being substantially rectilinear, inclined from the longitudinal axis and the forward extension of one slot being substantially parallel with the rear extension of the other slot, said floating lever having parts engaged in said slots.

5. In change speed mechanism, a shift lever, a floating lever engaged thereby to be moved from a first extreme position to a first neutral position and to a second extreme position, shift ratio forks having parts operably engaging the ends of said floating lever and mechanism operable to rock said floating lever about fulcra first at one end and then at the other as it is being bodily moved between its extreme positions, said mechanism comprising a plate having opposed cam slots, each slot having a transverse part and forward and rearward extensions, the extensions being substantially rectilinear, inclined from the longitudinal axis and the forward extension of one slot being substantially parallel with the rear extension of the other slot, said floating lever having parts engaged in said slots, said plate being mounted for transverse movement, yielding means to bias said plate to one of its positions, means associated with said plate to lock said forks in neutral position when moved against the resistance of said yielding means, and a third fork adapted to be moved by said shift lever and floating lever when said first forks are locked by said plate.

DEWEY L. MAKER.
HARRY E. FIDLER.